US007578083B2

(12) United States Patent
Luinstra

(10) Patent No.: US 7,578,083 B2
(45) Date of Patent: Aug. 25, 2009

(54) METHOD AND APPARATUS FOR VISUALIZING IMAGES

(75) Inventor: Jan Willem Johannes Luinstra, Voorst (NL)

(73) Assignee: Tele Merchandising International B.V. (NL)

( * ) Notice: Subject to any disclaimer, the term of this patent is extended or adjusted under 35 U.S.C. 154(b) by 217 days.

(21) Appl. No.: 10/513,217

(22) PCT Filed: May 2, 2003

(86) PCT No.: PCT/NL03/00322

§ 371 (c)(1),
(2), (4) Date: Dec. 2, 2004

(87) PCT Pub. No.: WO03/092842

PCT Pub. Date: Nov. 13, 2003

(65) Prior Publication Data

US 2005/0235534 A1 Oct. 27, 2005

(30) Foreign Application Priority Data

May 2, 2002 (NL) .................................... 1020517

(51) Int. Cl.
*G03B 25/02* (2006.01)

(52) U.S. Cl. ............................. 40/454; 40/490; 40/513; 40/445

(58) Field of Classification Search ................... 40/454, 40/453, 490, 513, 685, 658; 74/25, 49, 50
See application file for complete search history.

(56) References Cited

U.S. PATENT DOCUMENTS

| | | | | |
|---|---|---|---|---|
| 578,913 | A * | 3/1897 | Campbell | 40/325 |
| 3,579,878 | A * | 5/1971 | Griffin et al. | 40/654.01 |
| 3,660,919 | A | 5/1972 | Nagel | |
| 3,862,504 | A * | 1/1975 | Ringelheim et al. | 40/437 |
| 4,209,926 | A * | 7/1980 | Ueki et al. | 40/437 |
| 5,100,330 | A * | 3/1992 | Sekiguchi | 434/426 |
| 5,924,870 | A * | 7/1999 | Brosh et al. | 434/365 |
| 6,219,948 | B1 * | 4/2001 | Bar-Yona | 40/454 |
| 6,226,906 | B1 * | 5/2001 | Bar-Yona | 40/454 |
| 6,357,153 | B1 * | 3/2002 | Gelardi et al. | 40/454 |
| 6,748,684 | B1 * | 6/2004 | Bar-Yona | 40/454 |

FOREIGN PATENT DOCUMENTS

| | | |
|---|---|---|
| EP | 1 001 401 | 5/2000 |

* cited by examiner

*Primary Examiner*—Lesley D. Morris
*Assistant Examiner*—Christopher E Veraa
(74) *Attorney, Agent, or Firm*—Ostrolenk, Faber, Gerb & Soffen, LLP

(57) ABSTRACT

Apparatus for visualizing images, comprising: (a) a housing; (b) a window of transparent material with multiple lens effect arranged in a wall of the housing for making visible an image to be placed there behind; (c) moving means arranged in the housing for moving reciprocally a holder arranged behind the lenses of the window for holding a card-like medium with two or more images.

14 Claims, 2 Drawing Sheets

METHOD AND APPARATUS FOR VISUALIZING IMAGES

BACKGROUND OF THE INVENTION

The present invention relates to an apparatus for visualizing images, a card with two or more images thereon and a method for visualizing images.

Cards and coins having images thereon which appeal mainly to young people and children, such as images of Pokémon, Harry Potter and cartoon characters from the Fox Kids cartoons, are very popular. Not only are the cards and coins traded at many times the cost price thereof, the cards also have an important influence for advertising purposes and in promoting products. If such cards, with images of for instance Pokémon thereon, are packaged with the products, this can cause the market share of the manufacturer to increase by for instance 10%, as has been shown recently in practice.

SUMMARY OF THE INVENTION

An object of the present invention is to provide an improved card or coin for promotional and advertising purposes and an apparatus and a method therefor.

The present invention attempts to achieve the above stated objective and provides for this purpose an apparatus for visualizing images, comprising:

a housing;

a window of transparent material with multiple lens effect arranged in a wall of the housing for making visible an image to be placed therebehind;

moving means arranged in the housing for moving reciprocally a holder arranged behind the lenses of the window for holding a card-like medium with two or more images.

Using such an apparatus images can be visualized on card-like media in a manner involving lower production costs.

According to a further preferred embodiment, the invention provides an apparatus wherein ribs of the window form cylindrical lenses with a predetermined focal length. A cost-saving is achieved by arranging the cylindrical lenses in such an apparatus separately from the card-like medium, whereby the apparatus is particularly suitable for advertising purposes.

According to a further preferred embodiment the invention provides an apparatus wherein the focal length is in the order of 35 mm.

According to a further preferred embodiment the invention provides an apparatus wherein the moving means comprise:

a motor;

one or more toothed wheels and/or worms which are driven by the motor, wherein one of the toothed wheels comprises an eccentric cam which engages on a hook of the holder in order to move the holder having thereon the medium with the images.

According to a further preferred embodiment of the invention, the moving means comprise spring means for reciprocally moving and pushing the slide into a desired position. Owing to the spring means the apparatus can also function without motor, thereby achieving a greater cost-saving.

According to a further aspect the present invention provides a method for visualizing images, comprising the steps of:

arranging a housing;

arranging in a wall of the housing a window of a transparent material with multiple lens effect;

arranging behind the window a holder for holding a card-like medium with two or more images;

arranging moving means, wherein the moving means engage on the holder for reciprocal moving thereof.

Such a method provides new possibilities for advertising and promotion, wherein a cost-saving is also achieved compared to known methods.

BRIEF DESCRIPTION OF THE DRAWINGS

Further advantages and features of the present invention will be elucidated on the basis of the annexed figures, in which.

DESCRIPTION OF THE PREFERRED EMBODIMENT

Figure 1:
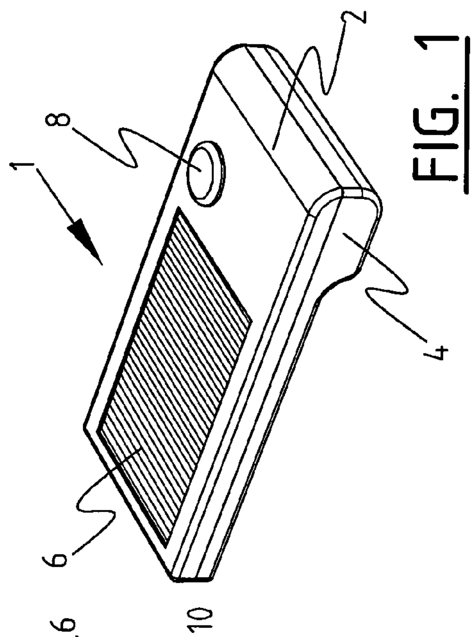
FIG. 1 shows a perspective view of a first preferred embodiment of the present invention.

An apparatus for visualizing images 1 consists of an upper part 2 and a lower part 4 of a housing. In the upper part 2 is arranged a window 6 of a transparent material, for instance a transparent plastic (FIG. 1).

Figure 2:
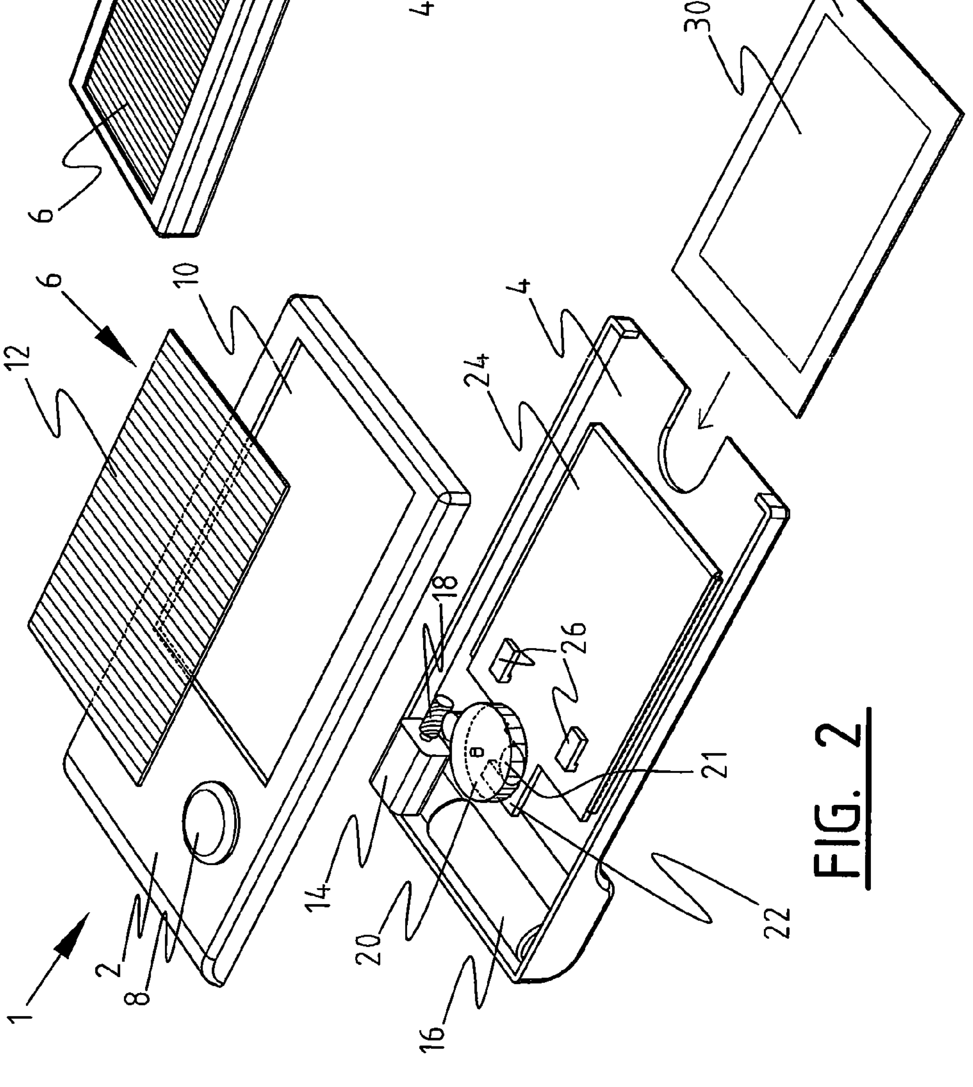
FIG. 2 shows a perspective, exploded view of the first preferred embodiment of FIG. 1.

An exploded view of apparatus 1 (FIG. 2) shows the upper part 2 of the housing having therein an elongate opening 10 in which the window 6 is arranged. Window 6 is flat on an underside thereof, while on the upper side it comprises the ribs 12 of semi-circular cross-section which provide a lens effect of the window. Ribs 12 have a focal length of about 35 mm and a width in the order of 0.5 mm. In the upper side 2 of the housing is arranged a round button 8 for operating a motor 14 accommodated in the housing.

In a practical embodiment the cards have dimensions of 8-10 cm long and 5-8 cm wide. Such a card or card-like medium may be made of a card-like body of cardboard, paper or plastic, or a combination of foregoing materials, with at least two images that are divided into linear segments and printed on alternate lines on the body. The housing then has dimensions on the order of 10-12 cm long, 7-10 cm wide and 1-2 cm high. The lens has 12 ribs per cm (30 ribs per inch) or, for an improved quality of image, 16 ribs per cm (40 ribs per inch).

In the underside of housing 4 is arranged an electric motor 14 and a battery 16 for driving the electric motor. By means of a worm 18 the motor 14 drives several toothed wheels in a continuous movement in order to transmit the movement and reduce the speed. Toothed wheel 20 has on one side (not shown) an eccentric cam which engages on a hook 22 of a slide 24. Due to the rotating movement of toothed wheel 20 the eccentric cam thereon will convert the rotating movement of about 30 rpm into a reciprocal movement of hook 22 and slide 24 in the longitudinal direction of the housing, with a speed varying between 0 and about 1.5 mm/s. Arranged on slide 24 are two clips 26, under which a card 28 can slide and be clamped fixedly. Card 28 is printed with a printing 30, wherein two or more images are divided into linear segments with a line width of about 0.3 mm, wherein the lines of different images are printed alternately on card 28. The result hereof is that the separate images can be seen mixed together and cannot therefore be viewed clearly in the normal situation without window, If card 28 with printing 30 thereon is clamped under the clips 26 of slide 24, it will co-displace with the slide and thus move reciprocally behind window 6. Owing to the lens effect of ribs 12, the images which are on alternate lines in the printing 30 hereby become individually visible, depending on the position of card 28 behind window 6. By now pressing button 8 the motor 14 will be set into operation, so that the different images become individually visible one after the other in a continuous movement. The images change at a speed of roughly 3 images per second.

Figure 3:
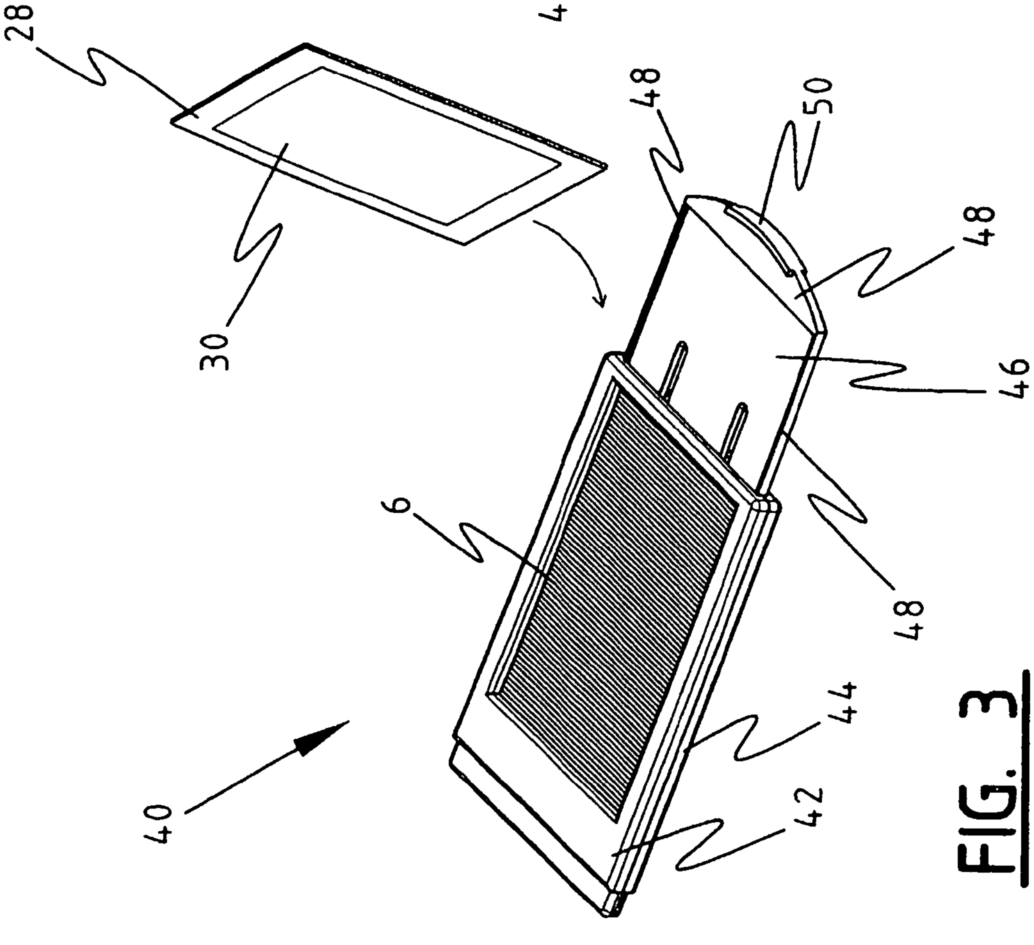
FIG. 3 is a perspective view of a second preferred embodiment of the present invention.
Figure 4:
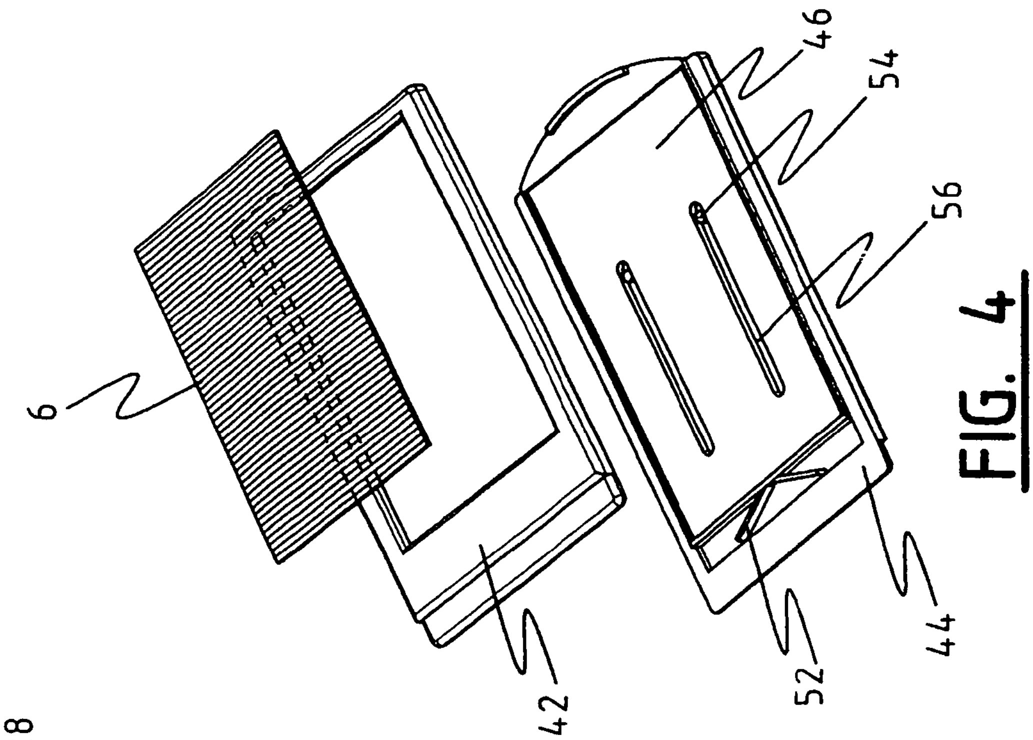
FIG. 4 is a perspective, exploded view of the second preferred embodiment of FIG. 3.

A similar type of apparatus (FIG. 3) once again comprises an upper part of a housing 42 and a lower part 44 thereof which are manufactured from plastic, wherein in an elongate opening in upper part 42 is arranged a lens 6 which is the same as the lens as described above in the first embodiment. A card 28 having thereon the printing 30 with two or more images, each printed on alternate lines, can now be placed on a slide 46. Slide 46 has standing edges 48 between which card 28 is arranged and held in place. Made on a round outer end is a thickened portion 50 with which a user can operate and press in the slide with the fingers, so that the card 28 with printing 30 thereon moves reciprocally behind window 6, wherein the images printed on alternate lines become individually visible owing to the lens effect of window 6. The fingers of the user herein provide the force to push the slide 46 into the housing. A spring 52 of for instance plastic or spring steel, which is arranged on the other end located opposite the thickened end 50, is herein compressed and produces an opposing force for the purpose of pushing the slide 46 out of the housing again. On the rear side of housing 44 are arranged two protrusions 54 which engage in slotted openings 56 in slide 46 in order to guide the slide.

With the invention according to the above described first and second embodiments thereof, cards and coins having thereon images printed on alternate lines can be visualized in a cost-effective manner. The cost price per card or coin is lower than according to the prior art, since the essential component, the window with lens effect, is included in a separate unit and not on the card. Owing to the lower cost price cards can be distributed per product in more cost-effective manner, so enhancing the specific application thereof, i.e. giving the cards away to promote a product or for advertising purposes.

The present invention is not limited to the above described preferred embodiments thereof; the rights sought are defined by the following claims, within the scope of which many modifications can be envisaged.

The invention claimed is:

1. An apparatus for visualizing two or more images printed on a card-like medium, comprising:

a housing having a wall;

a window of transparent material, the window located in the wall of the housing and configured to provide a multiple lens effect for making visible the two or more images placed behind the window;

a holder arranged behind the window, the holder including a medium-displaying side for holding the card-like medium with the two or more images and a medium-displaying area on the medium-displaying side configured to be underneath the card-like medium, the holder being reciprocally movable in a lengthwise direction of the housing behind the window with respect to the housing;

a moving device arranged in the housing and operable to reciprocally move the holder along the lengthwise direction;

a slotted opening extending in a lengthwise direction of the holder positioned and configured to guide the holder in the housing during movement of the holder in the lengthwise direction of the housing; and the housing comprising a protrusion extending inside the housing and configured to engage the slotted opening by extending from the housing through the slotted opening to couple in the medium-displaying area with the slotted opening to guide the holder during the movement of the holder.

2. The apparatus as claimed in claim 1, wherein the window includes ribs forming cylindrical lenses with respective predetermined focal lengths to provide the multiple lens effect.

3. The apparatus as claimed in claim 2, wherein the focal length of the lenses is on the order of 35 mm.

4. The apparatus as claimed in claim 1, wherein the moving device comprises a spring for reciprocally moving and pushing the holder into a selected position.

5. In combination the apparatus as claimed in claim 1, the card-like medium with the two or more images, the card-like medium being retained on the holder inside the housing.

6. The combination of claim 5, wherein the card-like medium comprises at least two images divided into linear segments across the card-like medium, and wherein the linear segments of a first image of the two images are printed alternately on the card-like medium with the linear segments of a second image of the two images, and the linear segments are sized and placed with respect to the apparatus such that each of the images may be viewed in at least one position of the card-like medium with reference to the lens elements, but not in all positions of the card-like medium.

7. The combination as claimed in claim 6, wherein the card-like medium comprises a card-like body of cardboard, paper or plastic, the at least two images being divided into linear segments printed on alternate lines on the body.

8. The combination as claimed in claim 7, wherein the window comprises at least 12 ribs per cm, each rib extending across the window in a width-wise direction of the window.

9. The combination as claimed in claim 8, wherein the housing has dimensions of 10-12 cm long, 7-10 cm wide and 1-2 cm high, and the card-like medium has dimensions of 8-10 cm long and 5-8 cm wide.

10. The combination as claimed in claim 7, wherein the window comprises at least 16 ribs per cm, each rib extending across the window in a width-wise direction of the window.

11. The apparatus as claimed in claim 1, further comprising:

a second protrusion extending inside the housing from the rear side of the housing; and a second slotted opening located on the holder and positioned to be engaged by the second protrusion, the second protrusion positioned and configured to engage the second slotted opening during the movement of the holder in the lengthwise direction of the housing.

12. The apparatus as claimed in claim 1, wherein the holder comprises retaining members positioned on a major surface of the holder facing the window and configured to removably retain the card-like medium on the holder.

13. The apparatus as claimed in claim 12, wherein the retaining members comprise standing edges positioned at edges of the major surface of the holder, the standing edges configured to hold the card-like medium between a first edge and a second edge of the standing edges.

14. A method for making an apparatus for visualizing two or more images printed on a card-like medium, comprising the steps of:

arranging in a wall of a housing a window of a transparent material with a multiple lens effect;

arranging behind the window a holder including a medium-displaying side for holding the card-like medium with the two or more images and a medium-displaying area on the medium-displaying side configured to be underneath the card-like medium, the holder including a slotted opening positioned on the medium-displaying side of the holder and operable to guide the holder in the housing during movement of the holder in a lengthwise direction of the housing;

arranging a moving member in the housing, wherein the moving member is operable to engage the holder for reciprocal movement of the holder along the lengthwise direction of the housing, wherein the slotted opening extends in a lengthwise direction of the holder, and wherein the housing comprises a protrusion extending inside the housing and configured to engage the slotted opening by extending from the housing through the slotted opening to couple in the medium-displaying area with the slotted opening to guide the holder during the movement of the holder.

* * * * *